United States Patent
Margalit et al.

(10) Patent No.: US 7,249,266 B2
(45) Date of Patent: Jul. 24, 2007

(54) USER-COMPUTER INTERACTION METHOD FOR USE BY A POPULATION OF FLEXIBLE CONNECTABLE COMPUTER SYSTEMS

(75) Inventors: Yanki Margalit, Ramat Gan (IL); Dany Margalit, Ramat Gan (IL)

(73) Assignee: Aladdin Knowledge Systems, Ltd., Tel Aviv (IL)

( * ) Notice: Subject to any disclaimer, the term of this patent is extended or adjusted under 35 U.S.C. 154(b) by 625 days.

(21) Appl. No.: 10/837,664

(22) Filed: May 4, 2004

(65) Prior Publication Data

US 2004/0202325 A1    Oct. 14, 2004

Related U.S. Application Data

(63) Continuation of application No. 09/412,292, filed on Oct. 5, 1999, now Pat. No. 6,748,541.

(51) Int. Cl.
*G06F 1/24* (2006.01)
(52) U.S. Cl. .......................... 713/193; 713/189
(58) Field of Classification Search ................ 713/193, 713/189
See application file for complete search history.

(56) References Cited

U.S. PATENT DOCUMENTS

| 5,278,395 A | 1/1994 | Benezet |
| 5,343,529 A | 8/1994 | Goldfine et al. |
| 5,371,794 A | 12/1994 | Diffie et al. |
| 5,926,624 A | 7/1999 | Katz et al. |
| 5,941,956 A | 8/1999 | Shirakihara et al. |

FOREIGN PATENT DOCUMENTS

| DE | 19631050 A1 | 2/1998 |
| EP | 0427465 | 5/1991 |
| EP | 0 554 164 A1 | 8/1993 |
| EP | 0 848 315 A2 | 6/1998 |
| WO | WO 94/10773 | 5/1994 |
| WO | WO 94/23399 | 10/1994 |
| WO | WO 98/13791 | 10/1998 |

OTHER PUBLICATIONS

Aladdin Knowledge Systems Ltd., Aladdin Press Forum, "Aladdin Knowledge Systems Announces Software Protection Solutions for Universal Serial Bus Port—USB-HASP & Hardlock-USB," Oct. 15, 1997, 2 Pages, HTTP://WWW.AKS.COM/PRESS_FORUM/PR/97OCT15.HTM.

(Continued)

*Primary Examiner*—Thomas R. Peeso
(74) *Attorney, Agent, or Firm*—Hoffman, Wasson & Gitler, PC

(57) ABSTRACT

A user-computer interaction method for use by a population of flexibly connectible computer systems and a population of mobile users, the method comprising storing information characterizing each mobile user on an FCCS plug to be borne by that mobile user; and accepting the FCCS plug from the mobile user for connection to one of the flexibly connectible computer systems and employing the information characterizing the mobile user to perform at least one computer operation.

22 Claims, 5 Drawing Sheets

OTHER PUBLICATIONS

Aladdin Knowledge Systems Ltd., Aladdin Press Forum, "Aladdin's USB Software Protection Key Scores 100% in Industry Tests," Dec. 8, 1997, 2 Pages, HTTP://WWW.AKS.COM/PRESS_FORUM/PR/97DEC8.HTM.

Aladdin Knowledge Systems Ltd., Aladdin Press Forum, "Industry-Leading Software Protection Via the New Universal Serial Bus (USB) Port With Total Transparency and Ease-of-Use," Mar. 2, 1998, 2 Pages, HTTP://WWW.AKS.COM/PRESS_FORUM/HASP98/PRESSUSB.HTM.

Aladdin Knowledge Systems Ltd., Aladdin Press Forum, "Aladdin Announces Development of MACHASP-USB," May 27, 1998, 2 Pages, HTTP://WWW.AKS.COM/PRESS_FORUM/HASP98/MACUSB.HTM.

Aladdin Knowledge Systems Ltd., Aladdin Press Forum, "Aladdin Launches MACHASP USB for Comdex," Nov. 12, 1998, 2 Pages, HTTP://WWW.AKS.COM/PRESS_FORUM/HASP98/MACHASPUSB.HTML.

Aladdin Knowledge Systems Ltd., Aladdin Press Forum, "Aladdin Announces Etoken-Next Generation Security Key Based on Universal Serial Bus Port," Jan. 19, 1999, 3 Pages, HTTP://WWW.AKS.COM/PRESS_FORUM/ETOKEN99/ETOKEN.HTML.

Rainbow Technologies, Inc. Press Release, "Rainbow Technologies Adds USB Support for PC and Macintosh Software Developers to Sentinel Line," Nov. 17, 1998, 2 Pages, HTT://WWW.RAINBOW.COM/INVEST/PR98111B.HTML.

Rainbow Technologies, Inc. Press Release, "Rainbow Technologies Announces New Exportable Ikey Universal Serial Bus (USB) Authentication Token," Mar. 15, 1998, 2 Pages, HTTP://WWW.RAINBOW.COM/INVEST/PR990315A.HTML.

Rainbow Technologies, Inc. Press Release, "Rainbow Technologies' Ikey Model M2 Now Available With Secure Digital Certificate Storage and 1024-Bit RSA Support," Mar. 15, 1999, 2 Pages, HTTP://WWW.RAINBOW.COM/INVEST/PR990315B.HTML.

Rainbow Technologies, Inc. Press Release, "Rainbow Today Announced its New OEM Line of Cryptographic USB Tokens for Virtual Private Networks (VPN)," Jan. 19, 1999, 2 Pages, HTTP://WWW.RAINBOW.COM/INVEST/PR990119A.HTML.

Universal Serial Bus Specification, Compaq, Intel, Microsoft, Nec, Sep. 23, 1998, Revision 1.1, pp. 1-311.

Materials Collected From the World Wide Web: Press Release, "Gemplus and SCM Microsystems Sign a Development and Manufacturing Agreement," Mar. 25, 1998, 1 Page, HTTP://PLUTON.GEMPLUS.FR/NS-SCARC.../AAAA1768037F23&NS-DOC-OFF.

Materials Collected From the World Wide Web: "Digital Persona Unveils Fingerprint Recognition System for PCS and Internet," Apr. 19, 1998, 1 Page.

P. Gueulle, "Un "dongle" á puce de télécarte," ("A Telephone Card Chip Dongle"), Electronique Radio Plans, Nov. 1991, No. 528, pp. 75-78.

"How Does it Work," WIBU-Key User's Guide, Version 2.5, pp. 12-16; 25-28; 153-154; and 163-164, Jul. 1998.

USER-COMPUTER INTERACTION METHOD FOR USE BY A POPULATION OF FLEXIBLE CONNECTABLE COMPUTER SYSTEMS

CROSS REFERENCE TO RELATED APPLICATIONS

The present application is a continuation appliction of U.S. patent application Ser. No. 09/412,292 filed Oct. 5, 1999 now U.S. Pat. No. 6,748,541.

FIELD OF THE INVENTION

The present invention relates to flexibly connectible computer apparatus and methods for using flexibly connectible hosts.

BACKGROUND OF THE INVENTION

The USB interface is described in specifications available over the Internet at www.usb.org.

Firewire technology, also termed "IEEE 1394 technology", is an alternative to USB which also provides flexible connectivity and is described in the IEEE 1394 standard.

USBHasp is an Aladdin software protection product, announced in October 1997, which includes a USB key. USBHasp does not control access of a user to a computer network but rather impedes interaction between software and a computer system by activating a copy of the software only if a USB key corresponding to that copy is plugged into the computer system.

Conventionally, the only devices which have interacted via USB have been computers, keyboard, monitor, printer, mouse, smart card readers, and biometric readers.

Conventional devices for providing computerized servicing to a mobile or stationary population of users typically include a smart card reader. The members of the mobile population bear smart cards which are used to interact with the computerized servicing device via the smart card reader.

A particular disadvantage of smart cards is that they require a smart card reader which is a relatively costly device. Computer hosts which are equipped with a smart card reader are a small subset of the universe of computer hosts because addition of a smart card reader makes the computer considerably more expensive.

German Patent document DE 19631050 describes an interface converter for a universal serial bus having a module with a processor that changes format and protocol into that of a different bus system.

Rainbow Technologies, Inc., in a news release dated 17 Nov. 1998, announce USB software protection keys which can also be used as authentication or access control devices. A unique ID number if assigned to each USB key, enabling the key to replace or supplement personal passwords. The unique ID of the USB key makes it useful as a notebook computer security device providing theft deterrence. Other uses for the USB keys include Web access control, client token for Virtual Private Network access, replacement for password generator tokens and storage of credentials, certificates and licenses.

In a news release dated 19 Jan. 1999, Rainbow Technologies, Inc. announce a new line of USB tokens for VPNs (virtual private networks) which provides end user client authentication to VPNs and enables operator access to secured network equipment. Features of these tokens include "Internet security small enough to fit on a key-ring" and "personalization for the end user". The tokens allow a user to keep personal information in his or her pocket rather than on a hard drive.

A new "unique per individual" model of its USB based tokens was announced by Rainbow Technologies Inc. on 15 Mar. 1999.

The disclosures of all publications mentioned in the specification and of the publications cited therein are hereby incorporated by reference.

SUMMARY OF THE INVENTION

The present invention seeks to provide improved flexibly connectible apparatus and improved methods for using the same.

There is thus provided, in accordance with a preferred embodiment of the present invention, a user-computer interaction method for use by a population of flexibly connectible computer systems and a population of mobile users, the method including storing information characterizing each mobile user on an FCCS plug to be borne by that mobile user and accepting the FCCS plug from the mobile user for connection to one of the flexibly connectible computer systems and employing the information characterizing the mobile user to perform at least one computer operation.

Further in accordance with a preferred embodiment of the present invention, at least one computer operation comprises authentication.

Also provided, in accordance with another preferred embodiment of the present invention, is a an FCCS plug device to be borne by a mobile user, the FCCS plug device including a portable device which mates with a flexibly connectible computer system and comprises a memory and information characterizing the mobile user and stored in the memory accessibly to the flexibly connectible computer system.

Also provided, in accordance with another preferred embodiment of the present invention, is a population of FCCS plug devices to be borne by a corresponding population of mobile users, the population of FCCS plug devices including a multiplicity of portable devices each of which mates with a flexibly connectible computer system and comprises a memory and information characterizing each mobile user in the population of mobile users and stored, accessibly to the flexibly connectible computer system, in the memory of the FCCS plug device to be borne by the mobile user.

Additionally provided, in accordance with another preferred embodiment of the present invention, is an FCCS plug device including a mating element operative to mate with a flexibly connectible computer system and a memory connected adjacent the mating element, thereby to form a portable pocket-size plug, wherein the memory is accessible to the flexibly connectible computer system via the mating element.

Also provided, in accordance with another preferred embodiment of the present invention, is an FCCS plug device including a mating element operative to mate with a flexibly connectible computer system and a CPU connected adjacent the mating element, thereby to form a portable pocket-size plug, wherein the CPU has a data connection to the flexibly connectible computer system via the mating element.

Further in accordance with a preferred embodiment of the present invention, the FCCS plug device also comprises a CPU connected adjacent the mating element, thereby to form a portable pocket-size plug, wherein the CPU has a data connection to the flexibly connectible computer system via the mating element.

Still further in accordance with a preferred embodiment of the present invention, at least one computer operation comprises digital signature verification and/or controlling access to computer networks.

Further in accordance with a preferred embodiment of the present invention, the information characterizing each mobile user comprises sensitive information not stored in the computer system, thereby to enhance confidentiality.

Also provided, in accordance with another preferred embodiment of the present invention, is a user-computer interaction method for use by a population of flexibly connectible computer systems and a population of mobile users, the method including storing confidential information not stored by the flexibly connectible computer systems on an FCCS plug to be borne by an individual user within the population of mobile users and accepting the FCCS plug from the mobile user for connection to one of the flexibly connectible computer systems and employing the confidential information to perform at least one computer operation, thereby to enhance confidentiality.

Preferably the apparatus also includes a microprocessor operative to receive the USB communications from the USB interface, to perform computations thereupon and to provide results of the computations to the data storage unit for storage and/or for encryption and/or for authentication and/or for access control.

The term "USB port" refers to a port for connecting peripherals to a computer which is built according to a USB standard as described in USB specifications available over the Internet at www.usb.org.

The term "USB plug" or "USB key" or "USB token" refers to a hardware device whose circuitry interfaces with a USB port to perform various functions.

The term "smart card" refers to a typically plastic card in which is embedded a chip which interacts with a reader, thereby allowing a mobile bearer of the smart card to interact with a machine in which is installed a smart card reader, typically with any of a network of machines of this type.

Also provided in accordance with a preferred embodiment of the present invention is an electronic token, which preferably mates with a flexible connection providing port such as the USB port of any computer system such as a PC, laptop, palmtop or peripheral. The electronic token preferably does not require any additional reading equipment. The token may authenticate information and/or store passwords or electronic certificates in a token which may be the size of a domestic house key.

Preferably, when the token is inserted into a flexible connection providing port, a highly secure "dual factor authentication" process (e.g. "what you have" plus "what you know") takes place in which (a) the electronic token is "read" by the host PCC or network and (b) the user types in his or her personal password for authorization.

Suitable applications for the electronic token include authentication for VPN, extranet and e-commerce.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
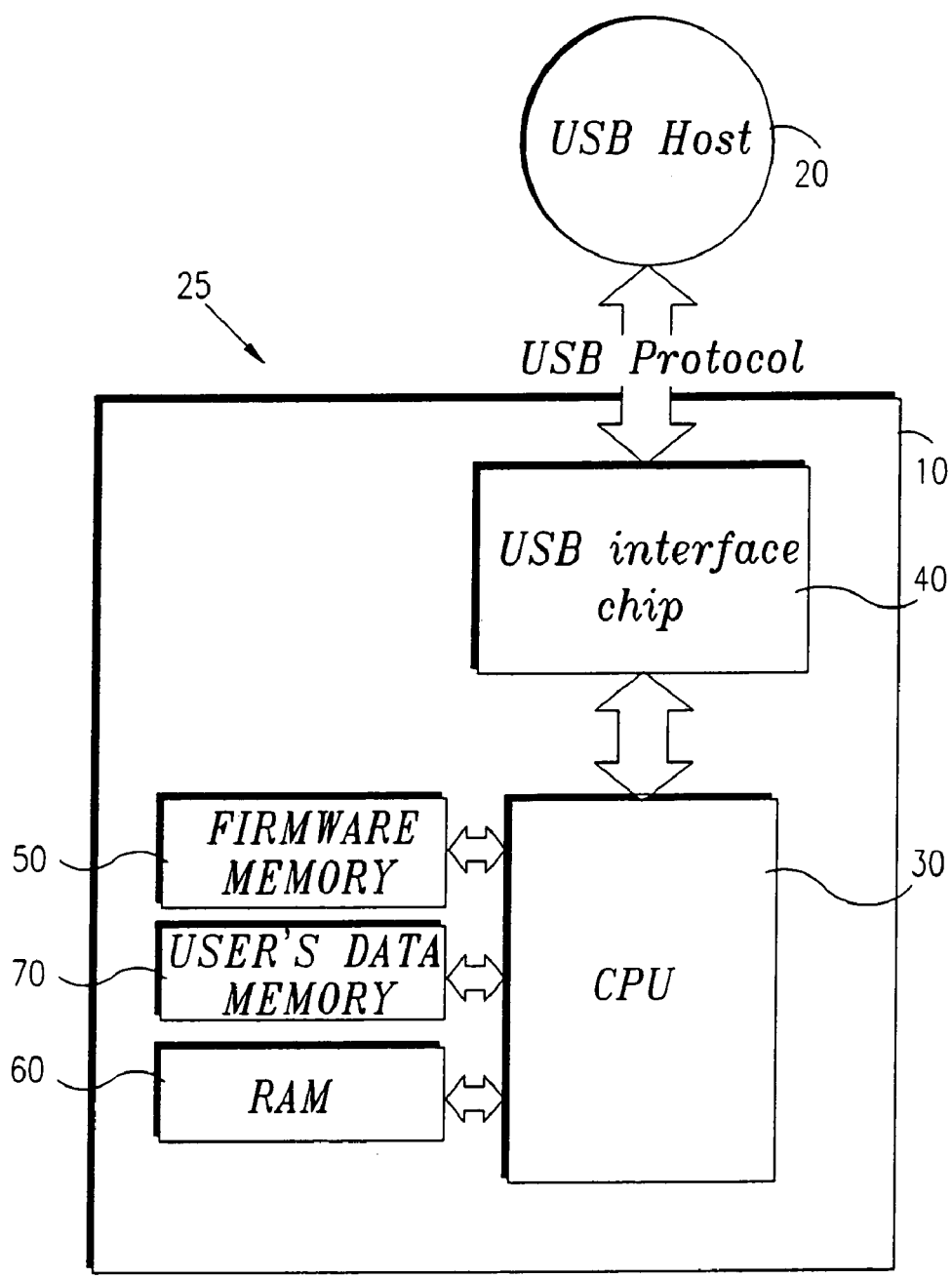
FIG. 1 is a simplified block diagram of a USB plug device including a CPU and a non-ISO7816 memory, the USB device being constructed and operative in accordance with a preferred embodiment of the present invention.

Reference is now made to FIG. 1 which is a simplified block diagram of a flexibly connectible USB plug device including a CPU and a non-ISO7816 memory, the USB device being constructed and operative in accordance with a preferred embodiment of the present invention.

A particular feature of the USB plug device of FIG. 1 is that it has data storage capabilities and is thus analogous to a memory smart card.

The USB plug device 10 comprises a PCB 25 which includes a microprocessor or CPU 30 such as a Motorola 6805, Cypress chip or Intel 8051; a USB interface device 40; firmware memory 50 serving the firmware of the microprocessor 30; RAM memory 60 of size sufficient to enable contemplated computations on the part of the microprocessor 30; and user data memory 70 which stores a user's data. Some or all of the USB interface device 40, firmware memory 50 and RAM memory 60 may be within the CPU 30.

The USB interface device 40 and/or the firmware memory 50 may be integrated inside the microprocessor 30.

The firmware memory may be any suitable type of memory such as but not limited to ROM, EPROM, EEPROM or FLASH.

The user data memory 70 typically does not include ISO7816-3 memory and may, for example, comprise any of the following types of memory: $I^2C$, $XI^2C$, ⅔ wire bus, FLASH.

As shown, the USB plug device 10 is configured to interact with any USB host 20 such as but not limited to a personal computer or Macintosh having a USB port. Key-host interaction is governed by a USB protocol such as the USB protocol described in the USB specifications available over the Internet at www.usb.org. USB packets pass between the USB host 20 and the USB interface chip 40. Each packet typically includes the following components:

a. USB header;

b. Data to be stored/read on the user's data memory 70, plus additional information required by protocols of the memory chip 70, such as but not limited to the address to store/read the data, the length of data to store/read, and CRC checksum information.

c. USB footer.

The flow of data typically comprises the following flow:

The USB interface chip 40 receives USB packets from the USB host 20, parses the data, and feeds the parsed data to the microprocessor 30. The microprocessor 30 writes the data to, or reads the data from, the firmware memory 50, the RAM 60 or the user's data memory 70, using each memory's protocol.

In read operation, the microprocessor 30 passes the data to the USB interface chip 40 which wraps the data in USB packet format and passes it to the host 20.

Figure 2:
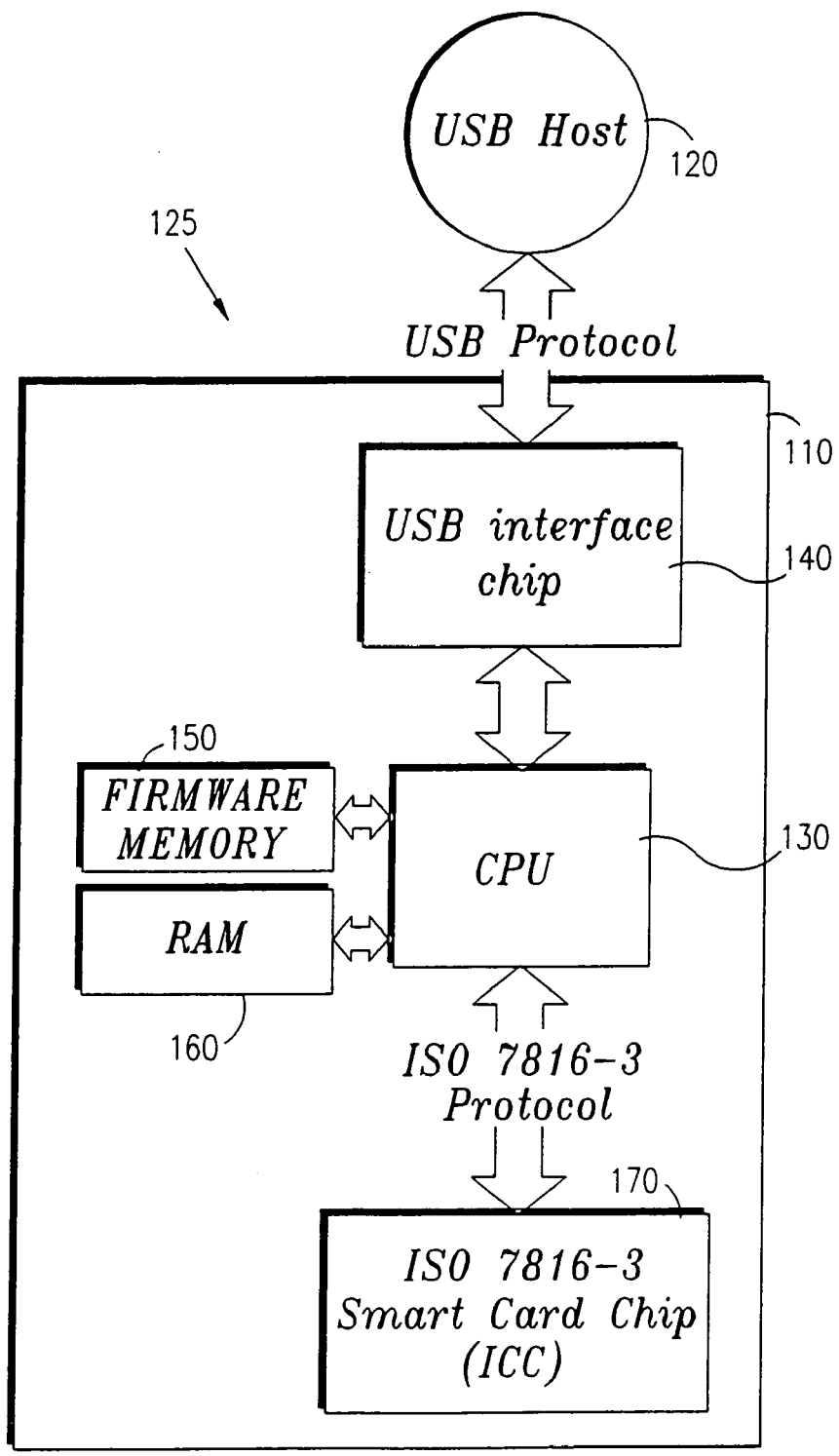
FIG. 2 is a simplified block diagram of a USB plug device including a CPU and a ISO7816 memory, the USB device being constructed and operative in accordance with a preferred embodiment of the present invention.

FIG. 2 is a simplified block diagram of a USB plug device, constructed and operative in accordance with a preferred embodiment of the present invention, which is a one-piece smart card reader and smart card chip preferably providing both secured storage and cryptographic capabilities. The USB plug device of FIG. 2 includes both a CPU and a smart card chip (ICC) memory 170, typically a ISO7816 (T=0/1) protocol-based chip communicating with the CPU 130 using an ISO7816-3 protocol. The apparatus of FIG. 2 is similar to the apparatus of FIG. 1 except that no separate user's data memory 70 is provided. The size of the RAM 160 is typically at least 262 bytes in order to support the ISO 7816_3 T=0 or T=1 protocols.

Each packet typically includes the following components:
a. USB header;
b. ISO7816-3 T=0/1 protocol packet;
c. USB footer.

The flow of data in the apparatus of FIG. 2 typically comprises the following flow:

The USB interface chip 140 gets USB packets from the USB host 120. The USB interface chip 140 parses the data and passes it to the microprocessor 130. The data, which typically comprises a ISO7816-3 T=0/1 formatted packet, is passed by the microprocessor to the smart-card 170 in a ISO7816-3 protocol. The microprocessor 130 gets the response from the smart card 170 and passes the data to the USB interface chip 140. The USB interface chip 140 wraps the data in USB packet format and passes it to the host 120.

A particular advantage of the embodiment of FIG. 2 is that smart card functionality is provided but there is no need for a dedicated reader because the plug 110 is connected directly to a USB socket in the host 120.

The invention shown and described herein is particularly useful for computerized systems serving organizations which process sensitive information such as banks, insurance companies, accountants and other commercial organizations, and professional organizations such as medical or legal organizations.

Conventional computer systems include a computer (comprising a motherboard) and at least one peripherals. The computer has a number of different ports which respectively mate with the ports of the various peripherals. Each port typically can mate with only certain peripherals and not with other peripherals. For example, the keyboard cannot be connected to the computer via the computer's printer port.

In state of the art computer systems, also termed herein "flexibly connectible computer systems", the computer and the peripherals each include at least one identical ports having mating ports on any other computer and any other peripheral such that any peripheral can be selectably connected to any computer or to any other peripheral. Also, a peripheral may be connected to the computer not directly as in conventional systems but rather via another peripheral. There is generally always a port available on one or more connected peripherals in an existing computer system such that another peripheral can generally always be connected to an existing computer system.

One example of a flexibly connectable computer system is a USB (universal standard bus) system in which the computer and each peripheral includes a USB port. Another example of a flexibly connectable computer system is the recently contemplated Firewire system.

A "USB plug" is a portable device which mates with a USB system and, as opposed to peripherals which contain mechanical elements, typically comprises only memory and/or CPU and therefore is typically pocket-size. More generally, a USB plug is an example of a plug which can be plugged into a flexibly connectible computer system (FCCS).

The term "FCCS plug" is used herein to refer to a portable device which mates with a flexibly connectible computer system and, as opposed to peripherals which contain mechanical elements, typically comprises only memory and/or CPU and therefore is typically pocket-size. It is appreciated that because each peripheral connected onto a flexibly connectible computer system typically has at least one port, therefore, a flexibly connectible computer system of any configuration typically has at least one vacant port available to interact with an FCCS plug. USB tokens and Rainbow tokens are both examples of FCCS plugs.

Typically, each of the plurality of computer system units (computer and one or more peripherals) forming a computer system has at least two identical female sockets and these are interconnected by means of male-male cables. In this embodiment, the FCCS plug may comprise a male socket. However, it is appreciated that any suitable mating scheme may be employed to mate the computer system units and the the FCCS plug of the present invention.

A known use for FCCS plugs is use in conjunction with software having plug-recognizing capability. Aladdin and Rainbow both market software which is operative only if the host computer system in which a particular software copy resides The Aladdin and Rainbow plugs are not used for authentication.

Computer systems are often used to receive information characterizing a mobile user, who is one of a population of mobile users, and to process this information. Such information may comprise user identity authentication information, banking information, access rights information, etc. Conventionally, this information is stored on a smart card which is borne by the user and is presented to the computer system by him. However this requires the computer system to be equipped with a smart card reader, a special piece of equipment dedicated to reading the smart card.

According to a preferred embodiment of the present invention, information characterizing a mobile user is stored on an FCCS plug. Particular advantages of this embodiment of the present invention is that the information is easily borne by the user, on a pocketsize substrate, that any flexibly connectible computer system of any configuration is typically capable of interacting with the user via the FCCS plug, and that no dedicated equipment is required by the computer in order to carry out the interaction.

Figure 3:
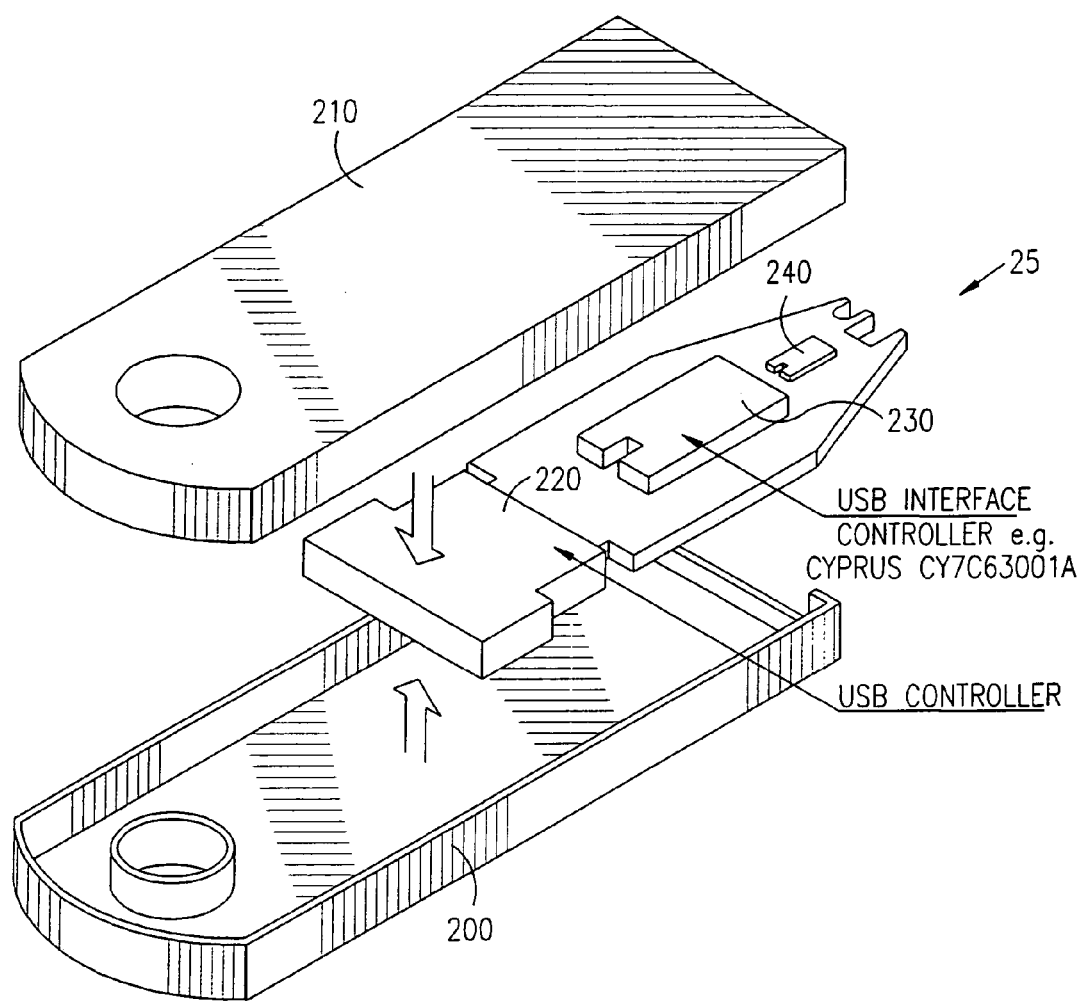
FIG. 3 is an exploded front view of an FCCS plug constructed and operative in accordance with a preferred embodiment of the present invention and implementing the USB plug device of FIG. 1.

Reference is now made to FIG. 3 which is an exploded front view of an FCCS plug constructed and operative in accordance with a preferred embodiment of the present invention and implementing the USB key device of FIG. 1. As shown, the FCCS plug of FIG. 3 comprises a housing typically formed of two snap-together planar cover elements 200 and 210, between which reside a USB connector 220 and the PCB 25 of FIG. 1. The USB connector 220 may, for example comprise a USB PLUG SMT <ACN-0213> device marketed by Aska Technologies Inc., No. 15, Alley 22, Lane 266, Fu Teh, 1st Rd., Hsl Chih, Talpei Shien, Taiwan. The PCB 25 bears the elements 30, 40, 50, 60 and 70 of FIG. 1. Firmware managing the memory 240 may reside on the USB interface controller 230.

Figure 4:
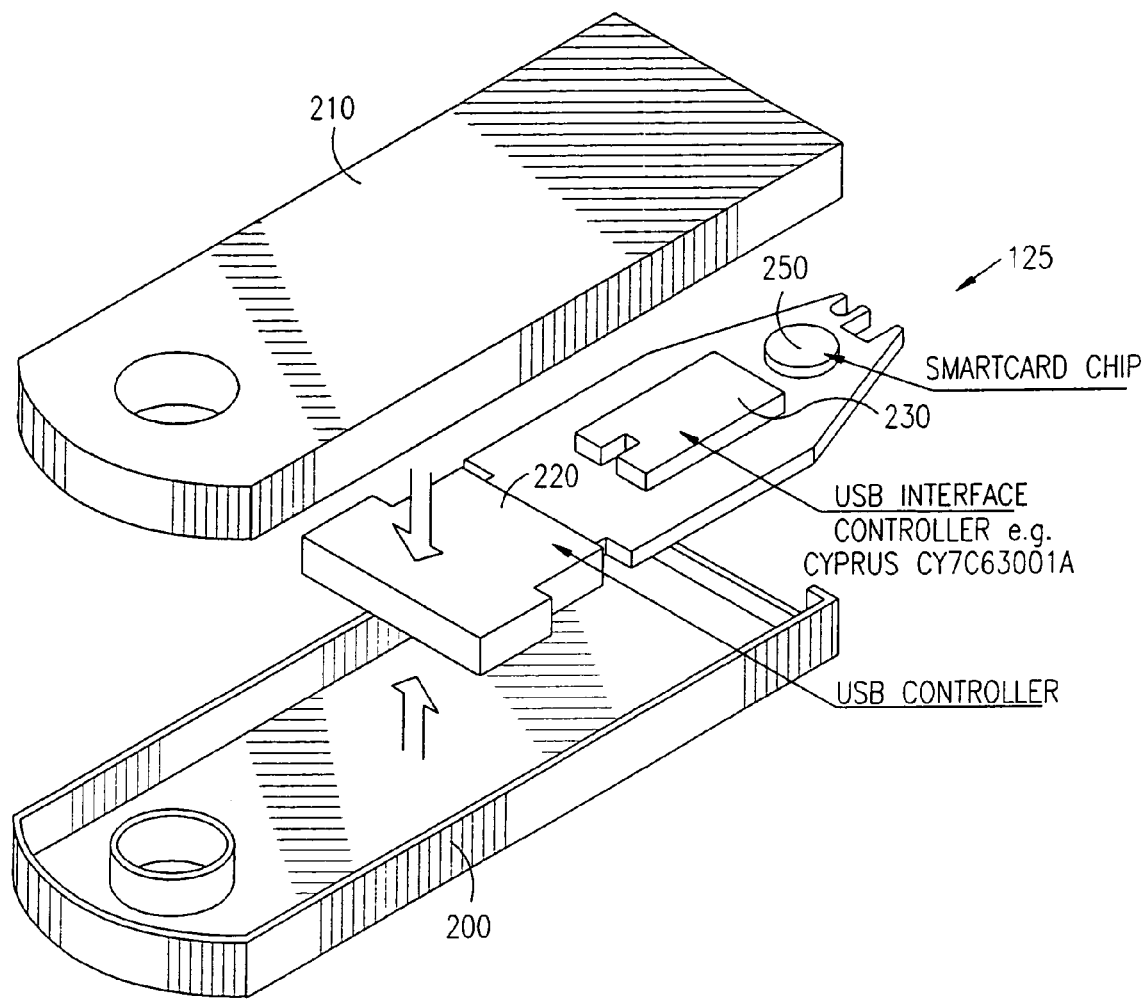
FIG. 4 is an exploded view of an FCCS plug constructed and operative in accordance with a preferred embodiment of the present invention and implementing the USB plug device of FIG. 2.

Reference is additionally made to FIG. 4 which is an exploded view of an FCCS plug constructed and operative in accordance with a preferred embodiment of the present invention and implementing the USB key device of FIG. 2. As shown, the FCCS plug of FIG. 4 comprises a housing typically formed of two snap-together planar cover elements 200 and 210, between which reside the USB connector 220 and a PCB 125. The PCB 125 bears the elements 130, 140, 150, 160 and 170 of FIG. 2. Firmware managing the smart card chip 250 may reside on the USB interface controller 230.

Smart card functionalities which are preferably provided by the FCCS plug of the present invention include:
1. Controlling access to computer networks: Smart card or plug has ID information, network authenticates and allows access on that basis. Authentication may be based upon "what you have", "what you are" e.g. biometric information and "what you know" (e.g. password).
2. Digital signatures or certificates for verifying or authenticating the identity of the sender of a document.
3. Storage of confidential information e.g. medical information. A smart card or plug may store confidential information and interact with a network which does not store the confidential information.

Figure 5B:
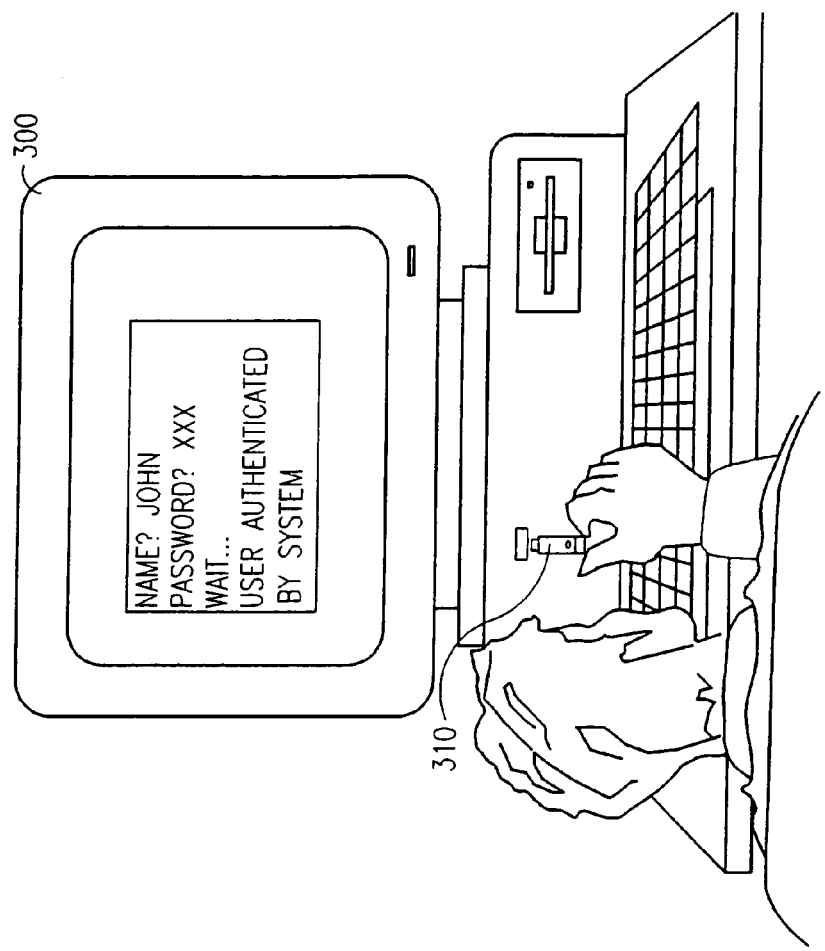
FIGS. 5A–5B pictorially illustrate a user-computer interaction method provided in accordance with a preferred embodiment of the present invention for use by a population of flexibly connectible computer systems and a population of mobile users.
Figure 5A:
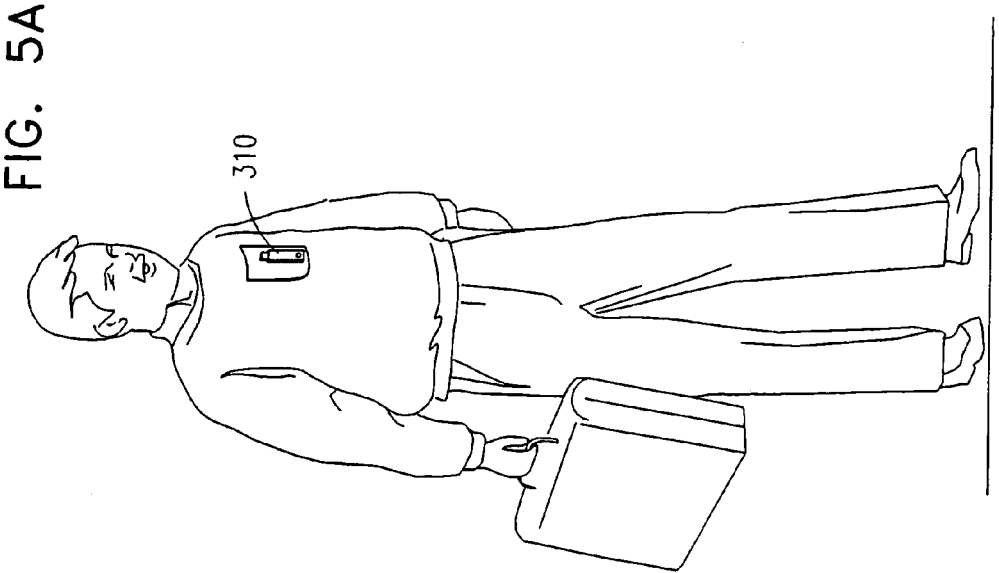

FIGS. 5A–5B pictorially illustrate a user-computer interaction method provided in accordance with a preferred embodiment of the present invention for use by a population of flexibly connectible computer systems 300 and a population of mobile users. Information characterizing each mobile user, e.g. name and ID, is loaded into the memory of an FCCS plug 310 to be borne by that mobile user, typically via a USB interface controller such as unit 230 of FIG. 3.

The plug can then be connected to one of the flexibly connectible computer systems and the information characterizing the mobile user employed to perform at least one computer operation typically comprising a conventional smart card functionality such as authentication.

Features of a preferred embodiment of the present invention are now described:
a. The need for enhanced user authentication
   Authentication is the basis for any information security system. The ability to authenticate local and remote users is a critical issue for any LAN/Intranet, multi-user environment
b. The need for encryption and confidentiality
   Content encryption & confidentiality becomes an important issue for both the corporation and the individual users
c. The need for password and Sign-On security
   Password security and user password management are key issues for network corporate users. Passwords represent the single most important security concern in any computing environment
   There is a need today for hardware-based PC security tokens
Sign-On-Key (SOK) is a hardware-based token that seamlessly integrates with Operating Systems & Applications to provide:
a user authentication key
a basis for encryption system
better Sign-On security and enhanced user password management Software Security Authentication—3 Basic Elements
Something you know --> Password
Something you have --> Sign-On-Key
Something you are --> e.g., Bio-metrics
Assumption: Two out of the above three provide "good-enough" security.

Encryption
The need to encrypt data, files, disks and information flow is evident.
An hardware-based token with cryptographic abilities can enhance security and ease-of use.

Sign-On—Where are Passwords Used?
Log on to your O/S
Log on to your Network (Local, Remote)
Log on to the Internet/ISP
Log on to protected Web pages
Log on to GroupWare/Communications applications
Log on to other sensitive password-protected applications
MS Office & other protected files
PC Boot protection (Bios Password)

Sign-On—Major Security Risks

The Sign-On Process
   The Sign-On-Key is a security hardware token, linked by the user to the required applications. Once installed the Sign-On-Key becomes a part of the log-on process. Sign-On-Key provides the user with many security and other functional benefits.

What Can Sign-On-Key Do For a User?
Sign-On Security
Enhance security & authentication. The Sign-On-Key is required in addition to the user password
Sign-On Simplicity
Simplify log-on process and eliminate the need for a password. The Sign-On-Key replaces the password
Password Automatic Re-verification
Check for Sign-On-Key periodically
Single-Sign-On
One Sign-On-Key replaces several passwords for several applications
Mobility & Remote Computing
Sign-On-Key identifies remote users
Sign-On-Key can be used as a data secure container
Theft deterrent of mobile PCs
General Purpose Security Token
File & data Encryption
Authentication
Certificate Key Holder Sign-On-Key Various Options
Several hardware devices may operate as Sign-On-Keys:
Sign-On-Key USB—A small key that connects to the new standard USB port. USB ports are becoming the new connectivity standard for PCs and Macintosh
Sign-On-Key SC—A smart card based Sign-On-Key. Can be used with any standard smart card drive Sign-On-Key USPs & Advantages
Simple, intuitive, easy to use, attractive token
The key IS the token IS the connector
Low cost
High security
High functionality Memory inside token
Processing power
Automatic Password Re-verification
Multi token connectivity
The Agents' solution Sign-On-Key Architecture Full Blown System.

Sign On Agents
The Sign-On-Agent is a software interface between the Sign-On-Key and the application.
The Sign-On-Boot is a special interface for the PC boot password.
Agents may be provided for:
OS/NetWare—e.g., Windows NT, 95/98, 3x, Novell, Unix
GroupWare/Mail—e.g, Lotus Notes, Outlook, Eudora,
Enterprise Applications—e.g., SAP, Baan, MK, Oracle, Magic
Web Browsers—e.g., Explorer, Navigator The Most Trivial Agent—Windows NT
The most trivial Agent will replace the Windows Login session
By doing so Users may gain
Windows Login Extra security
Windows Login simplification (Sign-On-Key replaces password)

Sign-On-Key Web Browsers' Agent/System
Sign-On-Key can be used as an authentication token to monitor access to secured web pages
Web content providers need to authenticate, manage and provide access to their customers Sign-On-Key API (SDK)
Sign-On-Key API is the interface level between the Sign-On-Key and 3rd parties' applications.
This API may be published and opened for usage by certification providers, security companies and SSO companies.
The Sign-On-Key API will also provide encryption & protected memory storage services
Sign-On-Key API may be PKCS #11 based/compatible The Sign-On Process (No CA)
Installation
User installs Agents for required applications
User defines Sign-On Parameters for each application
User stores Sign-On information in Sign-On-Key
Sign-On
Application is started
Application reaches its Sign-On dialog
Application communicates with the Sign-On-Key
Sign-On permission is granted based on Sign-On-Key Sign-On-Key As a Secure Container
In addition to unique Key ID, Sign-On-Key will contain personal protected memory area
This memory area can be used for storing sensitive information and Certificates
Applications' ID keys like Lotus Notes ID file or PGP keys can be stored in this memory
Doing so—Sign-On-Key can be used to increase mobile computing security. Files IDs are stored in Sign-On-Key instead of disk Sign-On-Key An Encryption Engine & Sign-On-Key Crypt
Sign-On-Key can be used as an encrypting device
An encryption API may be provided, e.g., a 100% smart card compatible Sign-On-Key implementation
Sign-On-Key Crypt is a Data/File/Hard disk encryption utility based on Sign-On-Key.

Sign-On-Key Certification Toolkit
SOK may use PKCS #11 and X509 and store certificates and/or digital IDs.

Sign-On-Key comprises:
Sign-On-Key USB Token
HASP
Hardlock
Initial Sign-On-Key functionality (Unique ID, personal protected memory)
Sign-On-Key USB extension cable
Sign-On-Key Smart Card Token
Sign-On-Key API (PKCS #11 compliant)
Entrust compatibility/link
Windows NT Agent
Navigator and/or Explorer Agent (S/Mime)
Key Plus Crypt (Beta release)
Secure Screen Saver
Initial marketing package
USB proliferation & Windows 98/NT availability are key issues
In the US, Germany & Israel all new PCs shipped are USB equipped.
Section in Early Development stage.
Security Dynamics, ActivCard & Vasco control the market with 1st generation time-based, one-time password or challenge-based tokens
security vendors will look to expand their market share with second generation integrated smart card offerings which will support cryptography, digital signature storage and processing activity USB: The Better Connection
Almost unlimited port expansion
No add-in cards for new peripherals
no setting of IRQs, DMAs, etc.
One connection type (plug and port)
variety of peripherals
no more guesswork
simple setup, just plug in and go USB: The Better Connection
Addresses need for speed, multimedia
12 Mb/s, Asynch (bulk) & Isoch (real time) data
stereo-quality digital audio
high frame-rate video (with compression)
high latency applications (force-feedback)
No power bricks with many new peripherals
USB supplies up to 500 mA
PC User experience is vastly improved
Fewer returns and increased sales potential It is appreciated that USB is only one example of a flexible connectivity standard and the present invention is not intended to be limited to USB.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. An FCCS plug device to be borne by a mobile user, the FCCS plug device comprising:
    a portable device which mates with a flexibly connectible computer system and comprises a memory; and
    information characterizing the mobile user and stored in said memory accessibly to the flexibly connectible computer system,
    wherein said FCCS plug device connects to said flexibly connectible computer system via a USB protocol; and
    said information characterizing the mobile user is employed to perform at least one computer operation.

2. An FCCS plug device according to claim 1, wherein said information characterizing the mobile user is selected from the group consisting of: an identity of said mobile user, authentication information, banking information and access rights information.

3. An FCCS plug device according to claim 1, wherein said at least one computer operation is selected from the group consisting of: authentication, two factor authentication, three factor authentication, authentication using biometry, digital signatures, storing confidential information, controlling access to computer networks, cryptography, content encryption, password security, Sign-On functionality, certifying a key holder, securing storage, one-time password and secure PIN entry.

4. An FCCS plug device according to claim 3, wherein said Sign-On functionality is operative to allow said mobile user to interact with at least one of: an operating system, a network, the Internet, an Internet Service Provider, a protected Web page, a group ware, a communication application, a sensitive password application, a protected file, a protected Microsoft Office file and a protected Bios.

5. An FCCS plug device according to claim 3, wherein the elements of said authentication are selected from the group consisting of: something said user knows, something said user has, something said user is, a password, a Sign-On-Key and biometric data of said user.

6. An FCCS plug device according to claim 1, wherein said memory is secured.

7. An FCCS plug device according to claim 1, wherein said memory is selected from the group consisting of: RAM, ROM, EPROM, EEPROM, FLASH, $I^2C$, $IX^2C$, 2/3 wire bus, SIM memory and smart card memory.

8. An FCCS plug device according to claim 1, further comprising a smart card chip.

9. An FCCS plug device according to claim 8, wherein said smart card chip is operative to perform at least one operation selected from the group consisting of: securing memory, cryptography, one-time password and secure PIN entry.

10. An FCCS plug device according to claim 8, wherein said smart card chip supports an ISO 7816-3 protocol.

11. An FCCS plug device according to claim 8, wherein said smart card chip is a SIM.

12. An FCCS plug device to be borne by a mobile user, the FCCS plug device comprising:
    means for directly connecting said FCCS plug device with a port of a flexibly connectible computer system; and
    a memory comprising information characterizing the mobile user operative to perform at least one computer operation, said memory being accessible to the flexibly connectible computer system.

13. An FCCS plug device according to claim 12, wherein said information characterizing the mobile user is selected from the group consisting of: an identity of said mobile user, authentication information, banking information and access rights information.

14. An FCCS plug device according to claim 12, wherein said at least one computer operation is selected from the group consisting of: authentication, two factor authentication, three factor authentication, authentication using biometry, digital signatures, storing confidential information, controlling access to computer networks, cryptography, content encryption, password security, Sign-On functionality, certifying a key holder, securing storage, one-time password and secure PIN entry.

15. An FCCS plug device according to claim 14, wherein said Sign-On functionality is operative to allow said mobile user to interact with at least one of: an operating system, a network, the Internet, an Internet Service Provider, a protected Web page, a group ware, a communication application, a sensitive password application, a protected file, a protected Microsoft Office file and a protected Bios.

16. An FCCS plug device according to claim 14, wherein the elements of said authentication are selected from the group consisting of: something said user knows, something said user has, something said user is, a password, a Sign-On-Key, biometric data of said user.

17. An FCCS plug device according to claim 12, wherein said memory is secured.

18. An FCCS plug device according to claim 12, wherein said memory is selected from the group consisting of: RAM, ROM, EPROM, EEPROM, FLASH, $I^2C$, $IX^2C$, 2/3 wire bus, SIM memory and smart card memory.

19. An FCCS plug device according to claim 12, further comprising a smart card chip.

20. An FCCS plug device according to claim 19, wherein said smart card chip is operative to perform at least one operation selected from the group consisting of: securing memory, cryptography, one-time password and secure PIN entry.

21. An FCCS plug device according to claim 19, wherein said smart card chip supports an ISO 7816-3 protocol.

22. An FCCS plug device according to claim 19, wherein said smart card chip is a SIM.

* * * * *